United States Patent [19]

Grilli et al.

[11] 4,262,973
[45] Apr. 21, 1981

[54] JUNCTION LINK FOR ENDLESS CHAIN TRACKS FOR TRACKED VEHICLES

[75] Inventors: Walter Grilli; Aldo Crotti; Emidio Manicardi, all of Modena, Italy

[73] Assignee: Ital-Tractor I.T.M., Castelvetro, Italy

[21] Appl. No.: 20,199

[22] Filed: Mar. 13, 1979

[30] Foreign Application Priority Data

Mar. 14, 1978 [IT] Italy .................................. 40042 A78

[51] Int. Cl.$^3$ ............................................. B62D 55/20
[52] U.S. Cl. ........................................ 305/54; 305/39; 403/294
[58] Field of Search ................... 305/39, 54, 59, 58 R; 74/248, 249, 250 R, 245 LP, 247, 258; 403/294, 356, 358; 59/85–87

[56] References Cited

U.S. PATENT DOCUMENTS

| 562,550 | 6/1896 | Merritt | 74/258 |
| 637,024 | 11/1899 | Penwell | 403/294 X |
| 3,715,136 | 2/1973 | Yoshida | 403/294 X |
| 3,822,923 | 7/1974 | Stedman | 305/58 |
| 3,853,360 | 12/1974 | Khuntia | 305/58 |
| 4,050,750 | 9/1977 | Yoshihashi et al. | 305/54 |

FOREIGN PATENT DOCUMENTS

16893 of 1893 United Kingdom ....................... 59/85

Primary Examiner—Charles A. Marmor
Attorney, Agent, or Firm—Browdy & Neimark

[57] ABSTRACT

A chain track junction link of the type having some characteristics of a conventional link is constructed as two complementary portions in order to effect opening and closing of a chain track. A union of the two portions of the link is effected by a connection member having ends of approximately prismatical shape, the member being I-shaped in section. In the two portions of the link are a plurality of grooves shaped in such a way that, when the two portions of the link are jointed, they form an approximately prismatic hole suitable for receiving the member which holds the two portions of the link firmly together. In order to increase the stability of the joint, a track shoe is screwed, using holes, to the head of the member.

4 Claims, 6 Drawing Figures

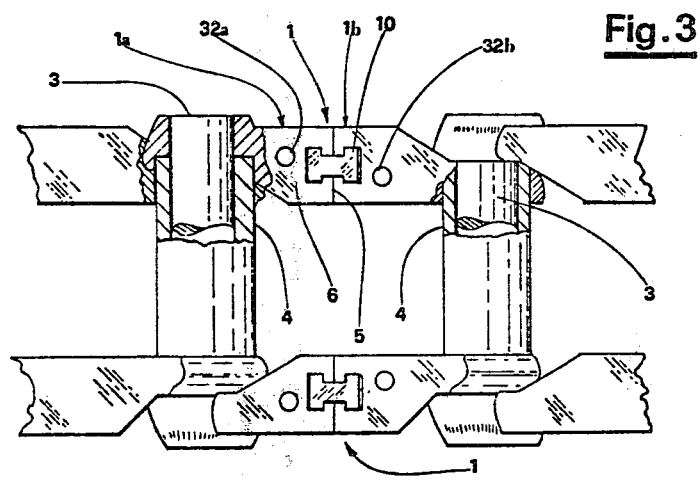
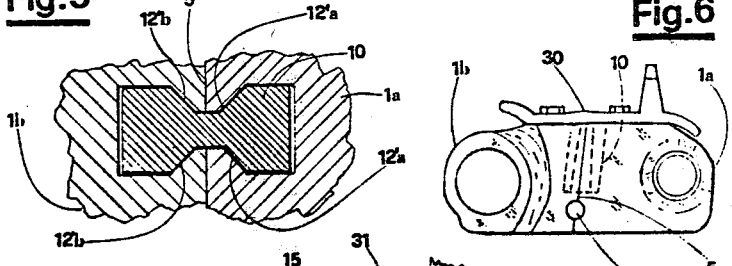
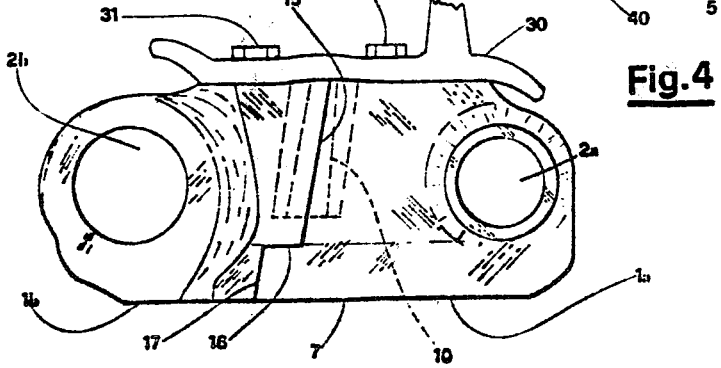

JUNCTION LINK FOR ENDLESS CHAIN TRACKS FOR TRACKED VEHICLES

BACKGROUND OF THE INVENTION

The present invention is directed to a chain track junction link and especially to such links for endless chain tracks of tracked transport vehicles. Every chain track, as regards tracked transport vehicles. Comprises a plurality of links connected to adjacent ones thereof by pivots and bushings which form an element closed in a ring-like fashion (chain).

The chain tracks are generally connected two by two and on their links are secured, on the external surface of the chain track, shoes of the track. For every chain it is necessary to forsee suitable jointing members, easy to dismount using hand-operated tools in order to realize a closure of the chain track during the phase of fitting the chain track up to the tracked machine, as well as the opening and repairing of the chain track itself or of the vehicle. To this end there are known at present special junction links, each one including a first and a second portion of the link complementary to each other, and such so as to form, using a reciprocal union, a complete link. These portions of the link are reciprocally separated by a separating surface which extends diagonally from the external face of the link, where the shoe is screwed on, to the interior face (opposite to the exterior face) and are connected to each other by connecting pins or bolts or by their combination.

SUMMARY OF THE INVENTION

The principal object of the present invention is to furnish a chain track junction link of the type described before but comprising parts and connecting members which make particularly simple assembly and disassembly, even in difficult conditions and without any need to use special tools, at the same time such parts and members realize particularly effective connections that can bear numerous and heavy stresses to which is subjected the link during the work of the tracked vehicle.

Another object of the present invention is to make particularly simple the junction of the to portions of the link, being forseen means which realize in a mechanical fashion a precise and effective junction.

Still another object of the present invention is to furnish the chain track junction link which can be machined in a simple and economical way, and, moreover, to eliminate the use of special type shoes to be connected to special chain track junction links, being instead permitted the use of normal type shoes.

The above-mentioned and other objects are all achieved by the chain track junction link subject of the present invention which is of the above-mentioned type, and is characterized by the fact that it includes: at least one connecting member, having an approximately prismatic form, provided along the center line of one of its lateral faces with at least a first groove, developing in the direction of generatrices which define two opposite interior faces of the groove; a second groove made in each portion of the link so as to affect the junction surface and placed approximately parallel to the surface, the second groove defining at least one interior face mating one of the interior faces of the first groove; the second grooves being shaped so that, mating the two surfaces of the junction, they form an approximately prismatic hole operatively arranged to receive the connecting member in its entirety.

BRIEF DESCRIPTION OF THE DRAWINGS

Further objects and features of the present invention will result better from the following, detailed description of some preferred by not exclusive forms of realization of the chain junction link subject of the present invention, illustrated for the mere sake of examplification and not intended as a limitation of any kind, with the aid of the accompanying drawings:

FIG. 3 shows a top view of a portion of the two connected chains comprising the two considered links, with the shoes taken off and some of the parts broken away.

FIG. 4 shows an upright projection side view of the second form of realization of the considered link.

FIG. 5 shows a transverse section of the second form of the connecting member.

FIG. 6 shows an upright projection side view of the third form of realization of the considered link.

DETAILED DESCRIPTION OF THE PREFERRED EMBODIMENTS

Figure 1:
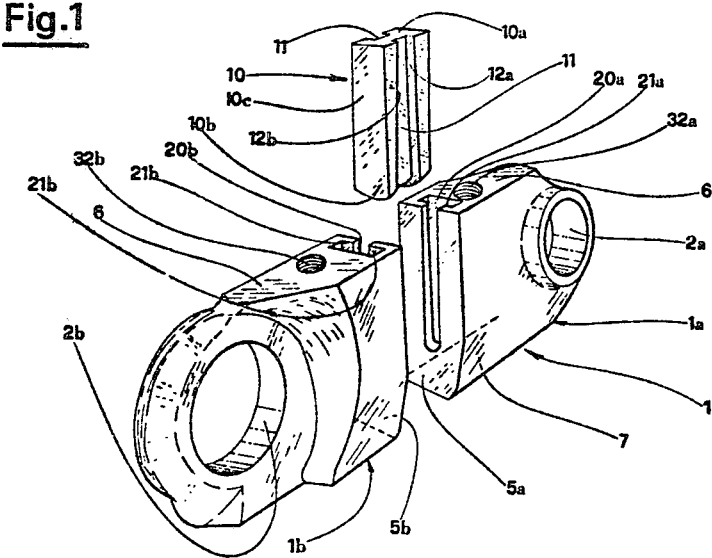
FIG. 1 shows the link, subject of the present invention, by means of a perspective view.
Figure 2:
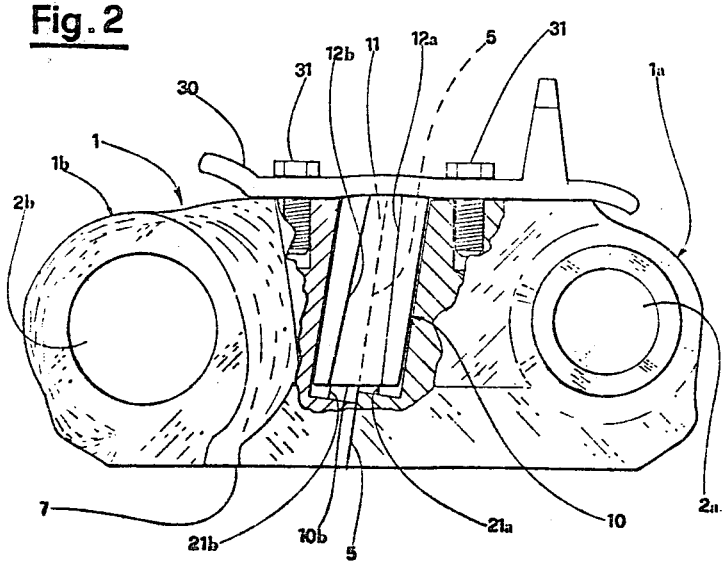
FIG. 2 shows an upright projection side view of the considered link, connected to its plate, with some of the parts broken away.

Referring now to the above-mentioned figures there is indicated as (1) the considered chain track junction link. It includes a first portion (1a) and a second portion portion (1b) of the link; these two portions are complementary to one another and such so as to form when coupled together, the complete link. Each portion includes entirely one of the two horizontal holes for connecting, by connecting pivots and bushings, the links of the chain track; the portion (1a) containes a hole (2a) within which the link is fixed to a pivot (3), while the portion (1b) contains a hole (2b) within which the link is fixed to a bushing (4) which can rotate coaxially to the pivot (3). it is known that to realize a chain track pair the links are set beside bushings and pivots in a symmetrical manner so that each pair there are needed two different chain junction links having a symmetrical shape one with respect to the other. The portions (1a) and (1b) each includes respectively a respective junction surface, (5a) and (5b), which is complementary and operatively arranged to mate with the other one. The portions are reciprocally jointed along the junction surfaces and the latter define a separating surface (5). The surfaces (5a) and (5b) are situated in a plane parallel to the axes of the holes (2a) and (2b) which extend from an exterior face (6) to an interior face (7) crossing the link with a slight inclination (e.g; 5–15 sexagesimal degrees) with respect to a vertical transverse plane (it is intended from now on, that the vertical transverse plane is the plane defined by the axes of the holes (2a) and (2b)).

The line of section, defined by the intersection of the separating surface (5) with the interior face (7), has to be spaced from the transverse center line, while such spacing is of no no importance with regards to the exterior face (6). The numeral (10) indicates a connecting member having an elongated approximately prismatic shape. In the two lateral opposite faces of the member (10) are made two grooves 11 (11) which develop in the direction of the generatrices and along the center lines of these faces. Each groove (11) defines two faces (12a) and (12b) opposite and internal with respect to the respective groove.

A transverse section of the member (10) has a substantially an I-form and the faces (12a) and (12b) define on this transverse section two pairs of opposite and parallel sides.

The faces (12a) and (12b) of each groove (11) are, moreover, reciprocally inclined with respect to the direction of the generatrices with a very slight inclination (few hexagesimal degrees) that converges in the direction of that end of the member (10) (called from now on the external end (10a)) which, after the jointing is completed, remains near to the exterior face of the link.

In each portion of the link (1a) and (1b) there is made a second groove, (20a) and (20b) respectively, in such a way as to define its own junction surface, (5a) and (5b) respectively, and situated approximately parallel to said surface.

Each groove (20a) and (20b) defines a pair of exterior faces, (21a) and (21b) respectively, each operatively arranged to mate one of the faces (12a) and (12b) of the groove (11); the two faces (21a) of the portion (1a) are operatively arranged to mate the two faces (12a) of the member (10) while the two faces (21b) of the portion (1b) are operatively arranged to mate the two faces (12b). These grooves (20a) and (20b) are shaped in such a way, that when the two junction surfaces mate, they form a single bore of an approximately prismatical form constructed and arranged to receive therein the member (10) in its entirety. When the latter is inserted into the hole, the faces (21a) and (21b) mate, with a perfect contact, the surfaces (12a) and (12b) respectively.

Therefore, after the jointing is completed, each face (21a) is inclined with respect to the opposite face (21b) in the same manner in which are inclined the faces (12a) and (12b) of each groove (11).

The cavity develops beginning from the interior face (7) and ends, at one end, on the exterior face (6) where there is screwed the shoe (30).

The two grooves (20a) and (20b) are nearly identical, and in the position when the junction surfaces (5a) and (5b) mate with one another, are situated in a substantially symmetrical way with respect to the junction surface (5); in particular there are symmetrically situated, with respect to the separation surface (5), the pairs of faces (21a) and (21b). Onto the exterior face (6) there is screwed a conventional shoe (30) of the tracked vehicle; the connection is provided by two screws (31) which get through the shoe and can be screwed into two blind threaded holes (32a) and (32b) made in the portions (1a) and (1b) respectively.

The position of the holes (32a) and (32b) on the face (6) is determined by the position of the corresponding holes of the shoe (30) which is of the type identical to the other shoes of the track.

The screws (31) are of sufficient but short length, in order not to interfer with the grooves (20a) and (20b). The holes (32a) and (32b) are therefore placed at the opposite sides with respect to the holes formed by (20a) and (20b) and at a short distance from the latter.

The assembly of the two portions of the link occurs in the following manner: the portion (1b) is rotated about the axis of its own hole (2b), or in any case is set beside the other portion (1a) until the two surfaces (5a) and (5b) mate or nearly mate; successively there is inserted the member (10) into the hole formed by the grooves (20a) and (20b) beginning from the lower end (10b) of the member (10); in the proximity of the end (10b) the distance between the faces (12a) and (12b) of each groove (11) is maximum and therefore the insertion of the member (10) into the hole occurs even if the jointing surfaces are not perfectly mated.

When the member (10) penetrates into the cavity, the interior faces (12a) and (12b) act, thanks to their reciprocal inclination, in a wedge-like manner on the faces (21a) and (21b) and consequently set a precise and pressed in junction of the two portions (1a) and (1b).

It is foreseen that after the jointing is completed, the end (10a) protrudes slightly with respect to the exterior face (6) of the link (to this purpose the end (10a) can be provided with a slightly convex surface). Hence the shoe (30), by means of screws (31), is screwed to the link keeping the member (10) pressed into the hole. The two portions (1a) and (1b) are therefore jointed to one another and the link is apt to resist efficaciously all the stresses of tension, flexure, shear and torsion to which it can be subjected during the operation of the tracked vehicle.

Moreover, since it has been found in practice, that the transverse center line of the interior face (7) of the link is one of the areas that wear down more than the others, it is foreseen, as described before, that the separating surface (5) ends on said interior face at the suitable distance from this area. The link subject of the present invention has also the advantage of being obtainable by means of a particularly economical process: in fact it can be obtained from a single link forged and then split into two portions thanks to the simplicity of the junction line.

Furthermore it requires only simple operations of boring out and milling and no special tools are needed. It is simple simple and economical to manufacture the member (10).

The surfaces of greatest importance for good working of the considered link are principally the internal surfaces of the grooves (11) and the surfaces corresponding to these grooves (20a) and (20b); on the contrary, the lateral faces (10c) of the member (10) which is not affected by the grooves, can present a slight distance from the corresponding faces of the grooves (20a) and (20b).

In FIG. 4 there is illustrated a second form of illustrative embodiment of the present invention which differs from the aforementioned by the different shape of the junction surfaces. The separating surface (defined by mating junction surfaces) consists, in fact, in a first portion of the surface (15) which departs from the exterior face of the link and proceeds slightly inclined, with respect to the transverse vertical plane, for a length at least equal to the length of the member (10); in a second portion of the surface (16), horizontal or nearly so and consecutive to the surface (15), and in a third portion of the surface (17), consecutive to (16), ending on the interior face (7) of the link with a slight inclination with respect to a vertical transverse plane.

It is thus obtained a 'step' which principal purpose is to hold up the eventual mutual sliding of the two portions (1a) and (1b) along the separating surface in the direction of the generatrices of the member (10). The length of the portion of the surface (16) will be of suitable value, and may also be such so as the portion (1a) contain or nearly so the internal surface (7) of the plate.

In FIG. 6 there is illustrated a third exemplary embodiment of the present invention which differs from the previous ones only as it includes a pin-like member (40) and, near to it, two third grooves. These grooves are made, one for each portion of the link, on the junction surfaces (5a) and (5b) and are placed perpendicularly to the grooves (20a) and (20b); moreover, they are shaped in such a way that, in mating the two surfaces (5a) and (5b), they form a single hole operatively positioned and arranged to receive a pin (40).

The principal purpose of this pin is to hold up, in both directions, the eventual mutual sliding of the two portions (1a) and (1b) along the separating surface (5) in the direction of the generatrices of the member (10).

According to another variant of the connection member (10), the latter can take a form like the one illustrated, by means of a section, in FIG. 5 where pairs of interior opposite faces (12'a) and (12'b) define, correspondingly to a generical transverse section, two pairs of opposite and convergent sides.

Obviously, there may be applied to the present invention numerous variations of practical and applicative nature of the constructive details, yet without getting out from within the scope of the inventive idea so as claimed hereinafter.

We claim:

1. A chain track junction link for endless chains of tracked vehicles, the link comprising a first portion and a second portion (1a, 2a) complementary to one another; each of said portions including a respective junction surface (5a, 5b) complementary to one another and shaped and sized to mate with the other said junction surface, each said portion of the link containing entirely a respective one of two horizontally extending apertures (2a, 2b) of the link for fixing the link to pivots and bushings of reciprocal connection of chain track links; at least one connection member (10) having two ends of approximately prismatical shape; at least a first groove (11) extending along a center line of at least one lateral face of said connecting member, developing in the direction of generatrices, which defines two opposite interior faces (12a) and (12b) internal with respect to said first groove; a respective second groove (20a, 20b), made respectively in each of said portions of the link, inward from respective said junction surfaces and positioned approximately parallel to the latter, each said second groove defining at least one interior face (21a, 21b) shaped and positioned to mate with a respective one of said interior faces (12a, 12b) of said first groove (11) and said second groove being shaped and positioned for mating said two junction surfaces (5a, 5b) forming a single aperture of an approximately prismatical form at its ends and shaped and sized to receive therein said connecting member (10), wherein said opposite faces (12a, 12b) internal with respect to said at least one first groove (11) of said connecting member (10) are reciprocally inclined with respect to the direction of the generatrices with a slight inclination which converges in the direction of a top, external face (10a) of said connection member.

2. A chain track junction link in accordance with claim 1, wherein both of said junction surfaces (5a, 5b), said internal faces (21a, 21b) of said second grooves (20a, 20b) are reciprocally inclined in the same manner in which said opposite interior faces (12a, 12b) of said first groove (11) are inclined.

3. A chain track junction link for endless chains of tracked vehicles, the link comprising a first portion and a second portion (1a, 2a) complementary to one another; each of said portions including a respective junction surfaces (5a, 5b) complementary to one another and shaped and sized to mate with the other said junction surface, each said portion of the link containing entirely a respective one of two horizontally extending apertures (2a, 2b) of the link for fixing the link to pivots and bushings of reciprocal connection of chain track lines; at least one connection member (10) having two ends of approximately prismatical shape; at least a first groove (11) extending along a center line of at least one lateral face of said connecting member, developing in the direction of generatrices, which defines two opposite interior faces (12a) and (12b) internal with respect to said first groove; a respective second groove (20a, 20b), made respectively in each of said portions of the link, inward from respective said junction surfaces and positioned approximately parallel to the latter, each said second groove defining at least one interior face (21a, 21b) shaped and positioned to mate with a respective one of said interior faces (12a, 12b) of said first groove (11) and said second groove being shaped and positioned for mating said two junction surfaces (5a, 5b) forming a single aperture of an approximately prismatical form at its ends and shaped and sized to receive therein said connecting member (10);

said single aperture having an approximately prismatical shaped ends develops, in the direction of its own generatrices, from an exterior face (6) to an interior face (7) of the link and ends on said exterior face (6) of the link and further including a shoe (30) secured to said exterior face.

4. A chain track junction link in accordance with claim 3, wherein said connecting member (10) in said single aperture protrudes slightly with respect to said exterior face (6) of the link, and is pressed into said single aperture by said shoe (30), said shoe being fixed to said external face by threaded members.

* * * * *